Jan. 21, 1958 E. A. BENDER 2,820,658
CONNECTING MEANS FOR STRUCTURAL ELEMENTS
Filed Dec. 4, 1953
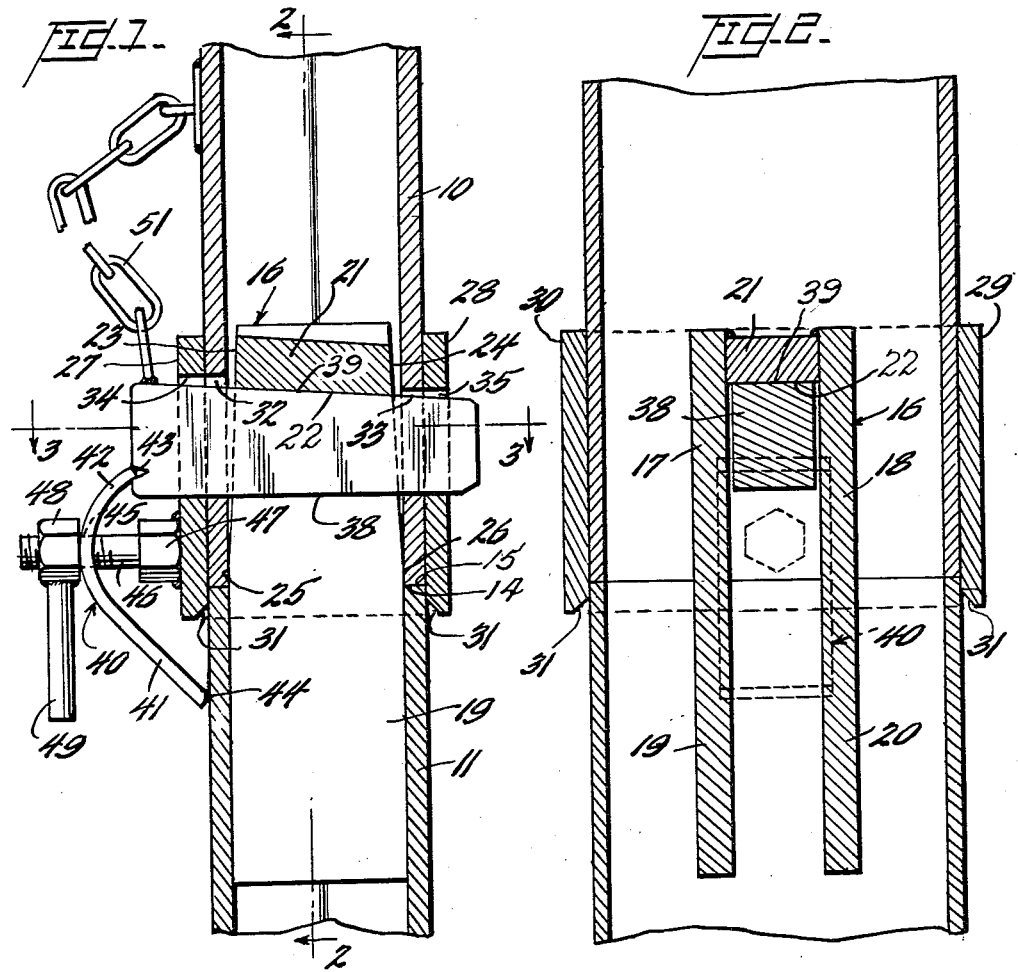
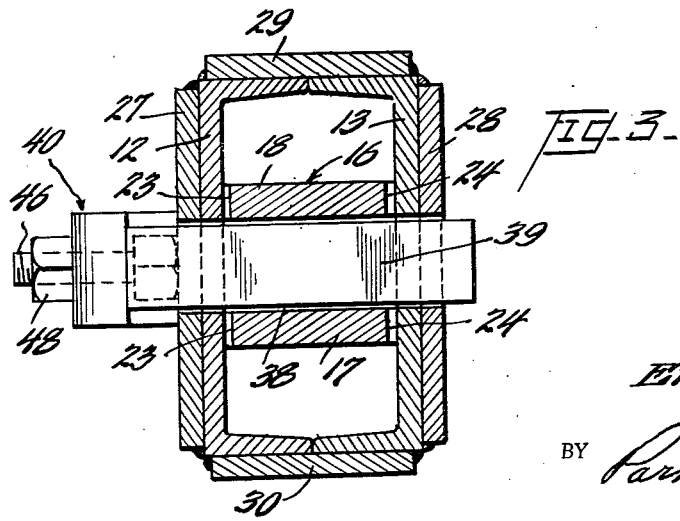
INVENTOR
Emil A. Bender
BY Parker and Walsh.
ATTORNEYS

United States Patent Office 2,820,658
Patented Jan. 21, 1958

2,820,658

CONNECTING MEANS FOR STRUCTURAL ELEMENTS

Emil A. Bender, Bakersfield, Calif.

Application December 4, 1953, Serial No. 396,201

6 Claims. (Cl. 287—103)

This invention relates to connecting means for structural elements, and more particularly to means for connecting the sections of the legs of oil-well derricks. The present application is a continuation-in-part of my prior co-pending application Serial Number 295,759 filed June 26, 1952.

An important object of the present invention is the provision of novel means for connecting structural elements in end-to-end relation wherein the assembly and connection of the parts may be carried out more quickly and accurately than heretofore, thereby speeding up the assembly operation.

A further object of the invention is to the provision of apparatus of the indicated type including cooperating means for guiding the structural elements accurately in end-to-end relation for the fixing of such elements to each other, thus greatly simplifying and speeding up the assembly operation.

Another object of the invention is the provision of means of the indicated type which functions to seat the lower end of a derrick leg section solidly and accurately on the upper end of the next lower-derrick leg section, the parts cooperating to guide the leg sections into such end-to-end relation and to clamp the upper leg section relative to the lower leg section.

Still another object of the invention is the provision of apparatus of the indicated type wherein an inner element is employed within the leg sections to transmit reaction forces downwardly on the upper leg section and upwardly on the lower leg section to solidly seat the contacting ends of the leg sections against each other, and wherein such inner element is carried by one of the leg sections and engages the other leg section as these sections are brought together to assist in guiding them into cooperative relationship with each other.

A further object of the invention is the provision of apparatus of the indicated type wherein the inner element guides the leg sections into cooperative engaging relation in one direction, and wherein auxiliary means cooperate between the leg sections to guide them into position in a plurality of directions, said guiding means also serving to maintain the leg sections in proper alignment during operation of the apparatus.

Another object of the invention is the provision of such a structure wherein a wedge element cooperates with the inner element referred to, to effect a clamping action of the leg sections in end-to-end relation, and to employ elements of the auxiliary guide means to increase the seating surface of the wedge in transmitting the reaction forces to one of the leg sections, thus materially strengthening the device.

A further object of the invention is the provision of a novel type of resilient means for urging the wedge element into, and maintaining it in, clamping position, whereby the same cannot work loose during operation of the apparatus.

These, and other objects and advantages of the invention, will become more apparent during the course of the following description, taken with the accompanying drawings, wherein:

Figure 1 is a vertical cross-sectional view taken through the adjacent ends of two derrick leg sections to show the present invention in use;

Figure 2 is a vertical cross-sectional view of the device taken along the line 2—2 of Figure 1; and Figure 3 is a horizontal cross-sectional view of the device taken on the lines 3—3 of Figure 1, but showng a clamping wedge in plan.

Referring to the drawings, the numeral 10 designates a structural element as, for example, a derrick leg section, which is to be connected to a next lower derrick leg section 11. These leg sections are preferably of closed cross section and may desirably be formed of channel members 12 and 13 having their flanges secured together, as shown. The lower extremity of the leg section 10 is preferably cut off square as at 14, while the upper extremity of the leg section 11 is similarly cut off as at 15, the two end surfaces being seated against each other with the leg sections in aligned relation.

Secured within the lower leg section 11 and projecting upwardly beyond the end thereof, is a relatively heavy-steel guiding-and-connecting element 16 which may be substantially U-shaped, as shown in Figure 2. This element comprises spaced, substantially parallel legs 17 and 18, the lower end portions 19 and 20 of which are slightly less in width than the internal width of the leg section 11. The portions 19 and 20 of the legs have their edges welded to the webs of the channel members 12 and 13 to fix them in position with respect to the leg section 11.

Adjacent their upper ends the legs 17 and 18 are joined by a transverse bar 21 extending between the inner faces thereof and secured thereto in any suitable manner, as by welding. The lower surface 22 of the bar 21 is substantially flat and is inclined from the horizontal, as shown in Figure 1, for a purpose to be described. The upper portions of the legs 17 and 18 have their edges beveled outwardly from the tops thereof downwardly, as shown at 23 and 24, such bevels stopping short of the upper end of the derrick leg section 11 to provide straight portions 25 and 26 adapted to engage opposite inner wall portions of the leg section 10.

It will be apparent that in assembling the leg section 10 relative to the leg section 11 by moving it downwardly thereover, the beveled edges 23 and 24 will guide the leg section 10 into position over the leg section 11 in one direction, namely, from left to right as viewed in Figure 1. As the ends of the leg sections approach closely to each other additional guiding means come into play, such means comprising plates 27, 28, 29 and 30. These plates are welded against the outer faces of the leg section 10 on each side thereof and have their lower extremities extending beyond the lower extremity 14 of the leg section 10, as clearly shown in Figure 1. Such lower extremities of the members 27, 28, 29 and 30 are chamfered or beveled as at 31, and it will be apparent that as the leg section 10 is assembled over the leg section 11, the chamfered edges 31 assist in positioning the leg section 10 so that the end thereof is properly aligned with the end of the leg section 11. Thus the members 16, 27, 28, 29 and 30 cooperate to properly position the derrick leg section 10 in end-to-end relation with the section 11, and, in addition, serve to positively maintain the leg sections in alignment at all times.

The sides of the leg section 10 which carry the plates 27 and 28 are provided respectively with openings 32 and 33. These openings have their lower edges horizontal and coplanar, the plane also being common to the lower edges of similarly formed openings 34 and 35, formed in the plates 27 and 28. The openings 32 and 34 are substantially higher than the openings 33 and 35 to accommodate a wedge 38 which is slipped through these openings from left to right, as viewed in Figure 1, in assembling the parts. The wedge 38 is preferably rectangular in cross-sectional shape, the top surface 39 thereof having a slope or inclination from the horizontal corresponding to the inclination of the surface 22 from the horizontal so that the top surface of the wedge fits the surface 22 throughout the width of the transverse bar 21. The cooperating or contacting surfaces of the wedge 38, the bar 21, and the lower edges of the openings 32, 33, 34 and 35 provide the desired clamping action.

In accordance with the present invention, a novel type of resilient means is provided for resiliently urging the wedge 38 to the right as viewed in Figure 1. Such means comprise a bar 40, formed of spring steel, and having a lower straight portion 41 and an upper, arcuately curved offset portion 42. The upper edge of the spring-steel bar 40 is adapted to engage in a recess 43 in the end of the wedge 38 and the lower edge thereof is rounded off as at 44 for bearing engagement with a side of the leg section 11.

In the curved portion thereof, the bar 40 is provided with an opening 45 for receiving a threaded stud 46 having a head 47 welded or otherwise secured to the plate member 27. A nut 48 is screw-threadedly engaged with the threaded stud 46 and has a handle 49 secured thereto to facilitate turning thereof. As the handle 49 is turned in a direction to advance the nut 48 along the threaded portion of the stud 46, it will be apparent that pressure will be brought to bear on the spring-steel bar 40 thereby causing the same to flex and resiliently urge the wedge 38 to the right, as viewed in Figure 1, to firmly hold the structural elements 10 and 11 in end-to-end engagement. As a result, the wedge 38 cannot work loose during operation of the apparatus but, on the contrary, is constantly urged into tight engagement with the transverse bar 21 and the lower edges of the openings 32, 33, 34 and 35. In this connection, it should be noted that the spring bar 40 is so formed, and the pressure of the nut 48 so exerted thereon, as to secure maximum effectiveness under all conditions of operation. Thus the portion of the bar 40 between the nut 48 and the wedge 38 is curved, and relatively short, as compared to the portion of the bar between the nut 48 and the side of the leg section 11 and, as a result, the former has considerably more stiffness.

In order that the wedge 38 be readily available when the leg sections 10 and 11 are being assembled, the same has a chain 51 secured thereto, as by welding, the other end of the chain being secured to, and carried by, the leg section 10.

*Operation*

The upper end of each derrick leg section above which another section is to be arranged is provided with one of the elements 16 welded in position, as previously described. Similarly, the lower end of each leg section which is to be arranged above the next lower leg section is provided with plates 27, 28, 29 and 30 welded hereto, the plates 27 and 28, in addition, being provided with the wedge-receiving openings 34 and 35. In assembling the parts, the upper leg section 10 is positioned over a next lower leg section 11 and then moved downwardly into position thereon. As the upper leg section moves downwardly over the element 16, the beveled or tapered edges 23 and 24 thereof act as guiding means to assist in properly positioning the leg sections. As the ends of the leg sections are moved closer together, the beveled edges 31 on the lower extremities of the plates 27, 28, 29 and 30 come into play and assist in bringing the ends of the sections into correct alignment. And finally, the inner, downwardly projecting flat surfaces of the plates above the beveled edges 31 positively hold the ends of the leg sections in correct alignment.

The ends 14 and 15 of the leg sections are thus brought into contacting relation, whereupon the wedge 38 is inserted through the openings 32, 33, 34 and 35, from left to right as viewed in Figure 1, the wedge passing between the legs 17 and 18 of the member 16 and the upper sloping or inclined surface 39 thereof engaging the lower inclined surface 22 of the transverse member 21. The spring-steel bar 40 is then positioned with the upper edge thereof bearing against the end of the wedge and the lower edge thereof bearing against the side of the leg section 11, as clearly shown in Figure 1, following which the nut 48 is turned in a direction to advance same until the spring-steel bar 40 is placed under sufficient tension to resiliently maintain the wedge in seated position.

It will thus be seen that the present invention provides an improved apparatus for quickly and easily moving the ends of structural members into aligned engagement and for positively maintaining them in such aligned engagement. Thus the tapered edges of the member 16 serve as initial guiding means which are later augmented by the beveled edges 31 of the plates 27, 28, 29 and 30. Moreover, when the ends of the structural members are in engagement the straight inner edges of the plates 27, 28, 29 and 30, which project below the lower edge of the structural member 10, serve to prevent relative horizontal movement of the members thereby serving to positively maintain them in correct alignment.

The wedge 38, and the elements of the device which cooperate therewith, firmly secure the structural elements together with their ends in pressure engagement, and such pressure engagement is maintained undiminished by the spring-steel bar 40. Thus the bar 40 exerts a continuous and constant pressure against the end of the wedge, resiliently urging it into tight engagement with the lower surface of the transverse member 21 and the lower edges of the openings 32, 33, 34 and 35. Moreover, the lower edges of the openings 34 and 35 in the plates 27 and 28 serve to increase the bearing surface for the wedge, thereby providing greater strength and a more effective clamping action.

While a preferred embodiment of the invention has been disclosed herein, the invention is not to be construed as limited to the specific details illustrated and described, except as included in the following claims.

I claim:

1. Apparatus for guiding a pair of structural elements of corresponding closed cross section into end-to-end relation and for maintaining them in said end-to-end relation comprising a first guiding means carried by one of said structural members and having tapered portions engageable with the other structural member to guide the latter laterally in one direction relative to said one structural member, a second guiding means carried by said other structural member and having chamfered or beveled portions engageable with said one structural member to guide said other structural member laterally in a plurality of directions, a wedge member connected between said first guiding means and said other structural member for fixing said structural members in end-to-end relation, and resilient means engaging said wedge and resiliently urging same into clamping engagement with said first guiding means and said other structural member.

2. Apparatus for guiding a pair of structural elements of corresponding closed cross section into end-to-end relation and for maintaining them in such relation comprising a first guiding means carried by one of said structural members and engageable with the other structural member to guide the latter laterally in one direction relative to said one structural member, a second guiding means carried by said other structural member and engageable with said one structural member to guide said other structural member laterally in a plurality of directions, said first guiding means being fixed within said one structural member and projecting beyond the end thereof and tapered to decrease in size for engagement wholly within said other structural member, a wedge member engaged between the tapered portion of said first guiding means and said other structural member for fixing said structural members in end-to-end relation, resilient means mounted on one of said structural members and engageable with an end of said wedge to urge it to seated position, and adjustable means for varying the tension on said resilient means to thereby vary the pressure on said wedge.

3. Apparatus for connecting a pair of structural elements of corresponding closed cross section in end-to-end relation comprising a yoke member mounted within one of said structural members and projecting beyond the end thereof for engagement within the other structural member, a plate mounted on each side of the other structural member and projecting beyond the end thereof for engagement with said one structural member, a tapered wedge of rectangular cross-sectional shape extending through said yoke member and through openings in said other structural member and movable lengthwise thereof to draw the ends of the structural members into pressure engagement, and means for preventing loosening of the wedge comprising a spring-steel plate member having an arcuately curved portion engageable with the end of the wedge and a substantially straight portion engageable with said one structural member, and means mounting said spring-steel plate on said other structural member and including adjustable means for tensioning said plate to exert a desired degree of pressure on said wedge.

4. Apparatus for connecting a pair of structural members of corresponding closed cross section in end-to-end relation comprising a tapered wedge member insertable through openings in one of said structural members, means carried by the other structural member for pressure engagement with said wedge member when it is inserted through the openings in said one structural member, said wedge member being longitudinally movable in said openings in one direction to increase its pressure engagement with said means whereby the ends of said structural members are drawn tightly together, a spring-steel plate member carried by one of said structural members for engagement with said wedge member and means for flexing said plate member whereby the same resiliently urges said wedge member in said one direction.

5. Apparatus for connecting a pair of structural members of corresponding closed cross section in end-to-end relation comprising a tapered wedge member insertable through openings in one of said structural members, means carried by the other structural member for pressure engagement with said wedge member when it is inserted through the openings in said one structural member, said wedge member being longitudinally movable in said openings in one direction to increase its pressure engagement with said means whereby the ends of said structural members are drawn tightly together, a spring-steel plate member carried by one of said structural members for engagement with said wedge member, said spring-steel plate member having a curved portion, one end of said plate member engaging an end of said wedge member and the other end of said plate member engaging a side of one of said structural members, and adjustable means carried by one of said structural members and engaging said plate member to tension same and thereby resiliently urge said wedge member in said one direction.

6. Apparatus for connecting a pair of structural elements of corresponding closed cross section in end-to-end relation comprising a yoke member mounted within one of said structural members and projecting beyond the end thereof for engagement within the other structural member, oppositely disposed plate members mounted on the sides of said other structural member and projecting beyond the end thereof, the projecting portions of said plates having bevelled portions for guiding the structural members into end-to-end alignment and straight portions for maintaining them in alignment, a tapered wedge of rectangular cross-sectional shape extending through said yoke member and through openings in said other structural member and movable lengthwise thereof to draw the ends of the structural members into pressure engagement, and means for preventing loosening of the wedge comprising a spring-steel plate member having an arcuately curved portion engageable with the end of the wedge and a substantially straight portion engageable with said one structural member, and means mounting said spring-steel plate on said other structural member and including adjustable means for tensioning said plate to exert a desired degree of pressure on said wedge.

References Cited in the file of this patent

UNITED STATES PATENTS

| | | |
|---|---|---|
| 1,570,226 | Bosco | Jan. 19, 1926 |
| 2,073,566 | Scheubner | Mar. 9, 1937 |
| 2,075,483 | Trotter | Mar. 30, 1937 |
| 2,092,022 | Rieger | Sept. 7, 1937 |
| 2,194,386 | Dunaway | Mar. 19, 1940 |

FOREIGN PATENTS

| | | |
|---|---|---|
| 7,741 | Great Britain | of 1890 |
| 1,996 | Great Britain | Jan. 25, 1912 |
| 10,832 | Great Britain | May 8, 1913 |
| 10,141 | Great Britain | Apr. 8, 1915 |
| 229,414 | Great Britain | Feb. 26, 1925 |
| 948,666 | France | Jan. 31, 1949 |
| 811,106 | Germany | Aug. 16, 1951 |
| 830,489 | Germany | Feb. 4, 1952 |
| 830,491 | Germany | Feb. 4, 1952 |